3,304,473
NONBURSTING ELECTRICAL CAPACITOR
Paul H. Netherwood, Livingston L. Rice, and David A. Hynes, Williamstown, Mass., assignors to Sprague Electric Company, North Adams, Mass., a corporation of Massachusetts
Filed Nov. 12, 1963, Ser. No. 322,761
1 Claim. (Cl. 317—256)

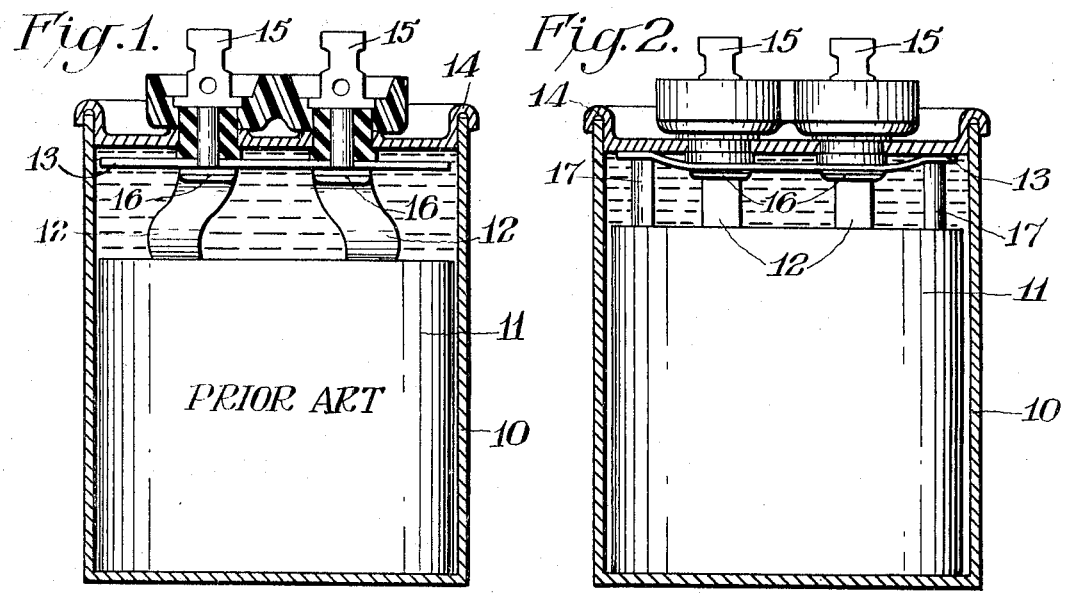
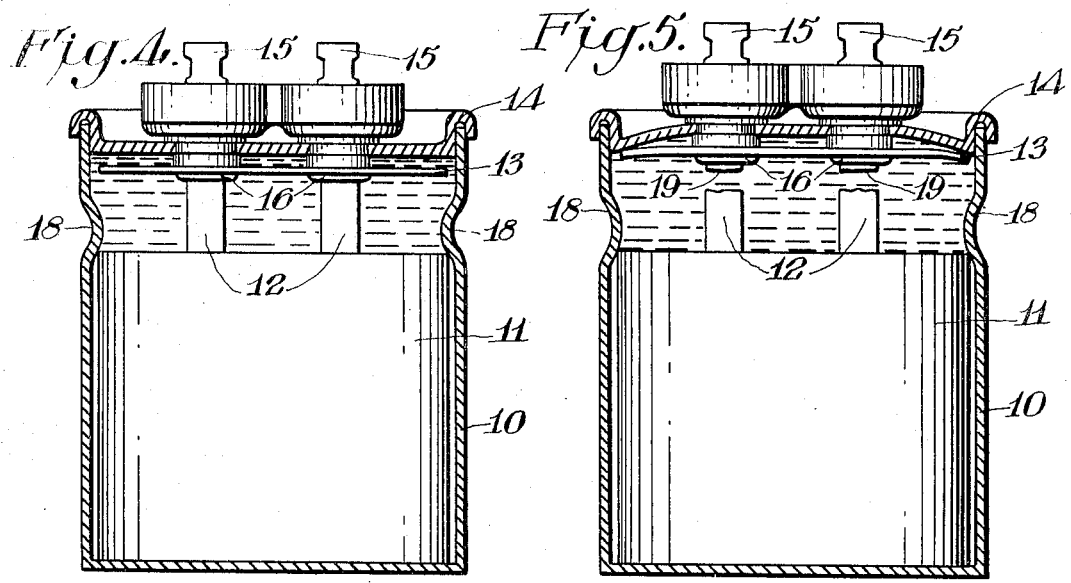
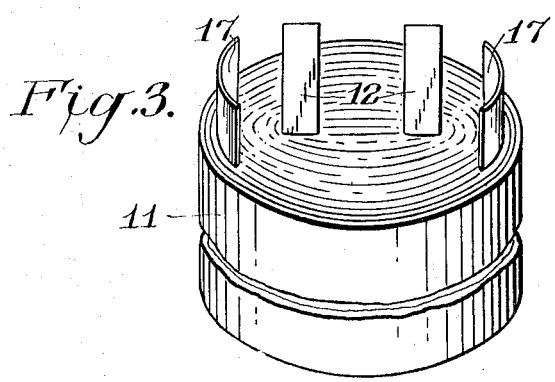

The present invention is concerned with electrical capacitors and more particularly with hermetically sealed capacitors which tend to generate sufficient internal gas pressure to burst the units.

The dangers of a bursting capacitor are well-known to those skilled in the art and need not be elaborated upon.

It is an object of this invention to eliminate the dangers attendant the bursting of a liquid dielectric-impregnated rolled capacitor.

This and other objects and advantages of the present invention will be made obvious to those skilled in the art by the following description when considered in relation to the accompanying drawing, of which:

FIGURE 1 is a side-view, partly in section of a conventional hermetically sealed, liquid dielectric-impregnated, rolled capacitor;

FIGURE 2 is a side-view, partly in section, of one modification of the present invention;

FIGURE 3 is a perspective view, partly broken away, of the capacitor section of FIGURE 2;

FIGURE 4 is a side-view, partly in section, of another modification of the present invention; and FIGURE 5 is a side-view, partly in section, of the capacitor of FIGURE 4 after being subjected to internal pressure.

FIGURE 1 illustrates a conventional hermetically sealed capacitor comprising a can 10 containing a rolled section 11; conductive tabs or leads 12; insulating spacer 13; can cover 14 and terminals 15. The conductive tabs 12 are soldered, riveted or welded to the bottom of terminals 15 as shown at 16. The capacitor is filled with a liquid dielectric.

It will be noted that tabs 12 in FIGURE 1 have considerable slack between the top of section 11 and the connections 16 at the bottom of the terminals. The reason that this slack is present in the capacitor is that the welding, soldering or riveting of the tabs to the terminals is accomplished by reaching under the can cover with the soldering, welding or riveting device and making the connection. Because of the physical size of the standard soldering, welding and riveting devices and the desire to actually see the connection made, it is, therefore, necessary to use a longer tab than is actually required for electrical communication.

An internal short in a capacitor of this type is one condition which results in the rapid generation of gas within the unit. When this occurs the can bulges in all directions with a considerable doming of the can cover. When the capacitor bursts, the point of opening is commonly at the seam joining the can cover and the can.

The objects of the present invention are attained by employing the bulging or doming of the can cover as the means for disconnecting at least one tab from its terminal connection and thereby stopping further rapid generation of pressure. This is accomplished by eliminating, from at least one tab, the tab slack between the top of the capacitor section and the tab connection at the bottom of the terminals and providing means which will restrain movement of the capacitor section during a pressure build-up in the can.

The tab slack is eliminated by employing special small size welding, soldering or riveting heads. These heads form no part of the present invention. As a result of the use of such a head there is no appreciable slack or excess tab between the section and the terminals. In combination with this substantially slack-free tab, a section-restraining means cooperates to protect the unit from bursting. The section-restraining means can be any element or arrangement which prevents the section from being pulled in the direction of the can cover during a build-up of pressure within the can. Examples of such means are, an internal beading in the can wall at a point adjacent the end of the section nearest the can cover; one or more strips of relatively inflexible insulating material extending from within the capacitor section near the periphery thereof to the underside of the can cover; a split ring, a collar or pair of semicircles of comparatively inflexible insulating material positioned between the section and the can cover, etc.

The invention is best illustrated by reference to FIGURES 2, 3, 4 and 5. FIGURE 2 has all of the essential capacitor elements of FIGURE 1 and in addition it shows that tabs 12 have no appreciable slack between the bottom of terminals 15 and the top of rolled section 11. The other end of tab 12, i.e. the end making contact with the section, although not shown, is firmly affixed as by a weld or stitches to the section. This prevents the tabs from moving freely within the section and insures tension on the terminal connections when internal pressure develops.

Extension members 17 protrude from capacitor section 11 and extend to the bottom of can cover 14. FIGURE 3 is a perspective view of section 11 of FIGURE 2, which more clearly shows the relative positions of extension members 17. When internal pressure begins to build-up within the unit of FIGURE 2, as it will when an electrical short circuit develops, can cover 14 will begin to bulge or dome. As the doming increases the entire section 11 will tend to be pulled in the direction of the can cover. This movement will be restrained by extension members 17 and as the doming continues, at least one tab 12 will be torn free of the bottom of terminals 15. This will interrupt the electric circuit, preventing any further rapid build-up of gas pressure.

In the modification of FIGURE 4 instead of having extension member 17 as the section restraining means, an internal beading 18 in the wall of can 10 at a point adjacent the end of the section is employed to prevent movement of the section. FIGURE 5 shows this unit after internal pressure has bulged the can cover causing tabs 12 to be disconnected from terminals 15 at point 19.

Another section restraining means which may be employed is a collar or a ring which is split. This means may be positioned between the can cover and the end of the section after the tab connections are made. As internal pressure builds up it will restrain section 11 in the same manner as extension 17 of FIGURE 2.

The restraining collar and the extension members 17 can be made of any material which will not yield under the force exerted by the doming of the can cover. Any one of a number of commercial plastics or resins may be employed. Wood, stiff paper or cardboard may also be used. In any case the material selected must be compatible with the other elements of the capacitor.

As an aid in insuring that the tabs or leads will be disconnected in the event of a rapid build-up of pressure the tabs or leads may be nicked or notched. This then will be the weakest point in the leads or tabs and the point of severance.

As is evident from the foregoing the invention is not to be limited to the rather specific illustrative device. Modifications and variations, as well as the substitution

What is claimed is:

An electrical capacitor consisting essentially of a capacitor section in a hermetically sealed can, said can having a cover domable in response to increasing internal pressure; conductive tabs firmly affixed to said section; said section being connected to terminals in said cover via said conductive tabs, at least one of said tabs being substantially slack-free; at least one strip of relatively inflexible insulating material extending from within said capacitor section at a point near the periphery thereof and extending to the underside of said cover, said strip functioning as a section restraining means fixedly locating said section in said can; whereby progressive doming of the cover, in response to increasing internal pressure, disrupts electrical communication between said slack-free tab and its terminal thereby stopping further rapid generation of pressure before bursting of the capacitor.

References Cited by the Examiner

UNITED STATES PATENTS

| 2,029,430 | 2/1936 | Kopinski | 317—260 |
| 2,896,049 | 7/1959 | Maier | 13—256 X |
| 3,182,238 | 5/1965 | Toder | 317—260 |
| 3,221,225 | 11/1965 | Sternbeck | 317—256 |

FOREIGN PATENTS 1,298,073   5/1962   France.

LEWIS H. MYERS, *Primary Examiner.*

JOHN F. BURNS, ROBERT K. SCHAEFER, LARAMIE E. ASKIN, *Examiners.*

E. GOLDBERG, *Assistant Examiner.*